United States Patent
Remke et al.

(10) Patent No.: US 6,222,160 B1
(45) Date of Patent: Apr. 24, 2001

(54) FOOD TRANSPORT CONTAINER WITH INTEGRAL HEATER

(75) Inventors: Matthew S. Remke, Atlanta; Jeanne L. Dahlke-Baumann, Duluth, both of GA (US)

(73) Assignee: ATD Corporation, Norcross, GA (US)

( * ) Notice: Subject to any disclaimer, the term of this patent is extended or adjusted under 35 U.S.C. 154(b) by 0 days.

(21) Appl. No.: 09/513,668

(22) Filed: Feb. 25, 2000

Related U.S. Application Data

(60) Provisional application No. 60/122,146, filed on Feb. 26, 1999.

(51) Int. Cl.[7] ............................. H05B 3/06; H05B 3/34; A21B 1/52
(52) U.S. Cl. ................. 219/387; 219/528; 219/540; 219/546; 219/549
(58) Field of Search ................................. 219/385–387, 219/528, 530, 540, 544, 546, 549

(56) References Cited

U.S. PATENT DOCUMENTS

| | | | |
|---|---|---|---|
| 3,697,728 | 10/1972 | Stirzenbecher | 219/548 |
| 3,721,803 | * 3/1973 | DiStefano | 219/387 |
| 4,806,736 | 2/1989 | Schirico | 219/386 |
| 4,816,646 | 3/1989 | Solomon et al. | 219/387 |
| 4,922,626 | 5/1990 | Fiddler | 34/80 |
| 5,111,577 | 5/1992 | Sheridan et al. | 29/890.039 |
| 5,408,068 | * 4/1995 | Ng | 219/535 |
| 5,408,071 | 4/1995 | Ragland et al. | 219/530 |
| 5,436,429 | * 7/1995 | Cline | 219/528 |
| 5,633,064 | 5/1997 | Ragland et al. | 428/95 |
| 5,767,024 | 6/1998 | Anderson et al. | 442/378 |
| 5,800,905 | 9/1998 | Sheridan et al. | 428/157 |
| 5,880,435 | * 3/1999 | Bostic | 219/387 |
| 5,892,202 | * 4/1999 | Baldwin et al. | 219/387 |
| 5,939,212 | 8/1999 | Ragland et al. | 428/594 |
| 5,958,603 | 9/1999 | Ragland et al. | 428/595 |
| 6,018,143 | * 1/2000 | Check | 219/387 |

FOREIGN PATENT DOCUMENTS

WO98/44835 4/1998 (WO).

* cited by examiner

Primary Examiner—Joseph Pelham
(74) Attorney, Agent, or Firm—Burns, Doane, Swecker & Mathis LLP

(57) ABSTRACT

A heated container for transport of prepared hot food has a combination of an electric heating element with an insulation layer comprising metal foil layers and fiber layers. The combination of metal foil layers, which spread the heat from the heating element, and the fiber insulation layers provides an efficient food transport container having sufficiently low power requirements to enable powering the heater element from an automotive 12 volt system while maintaining a food temperature inside the container at about 150° F.

12 Claims, 2 Drawing Sheets

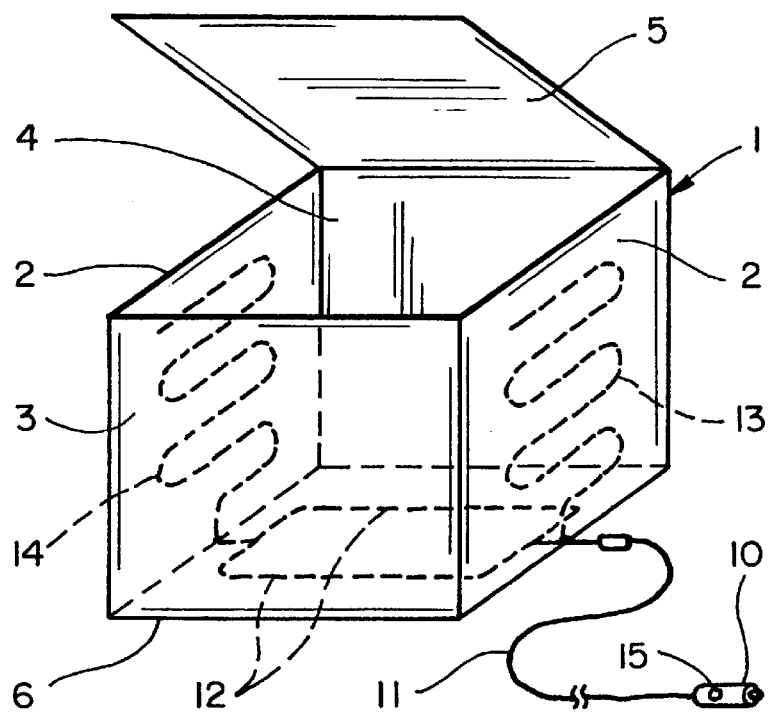
FIG_1
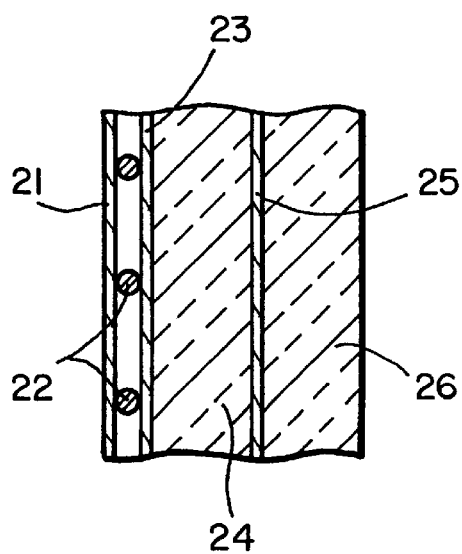
FIG_2

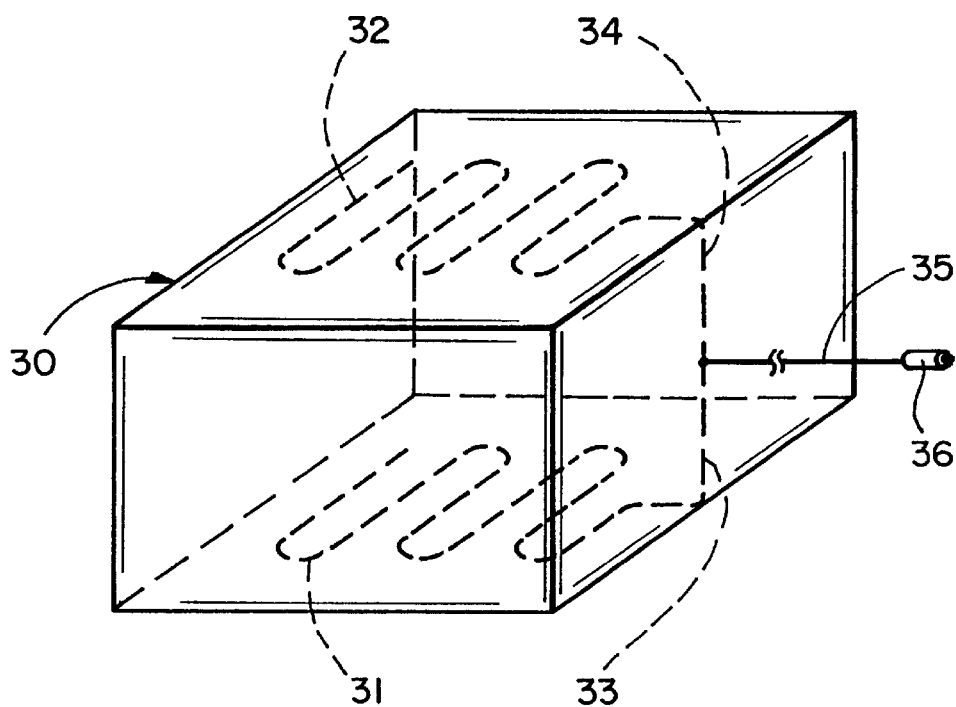
FIG_3A
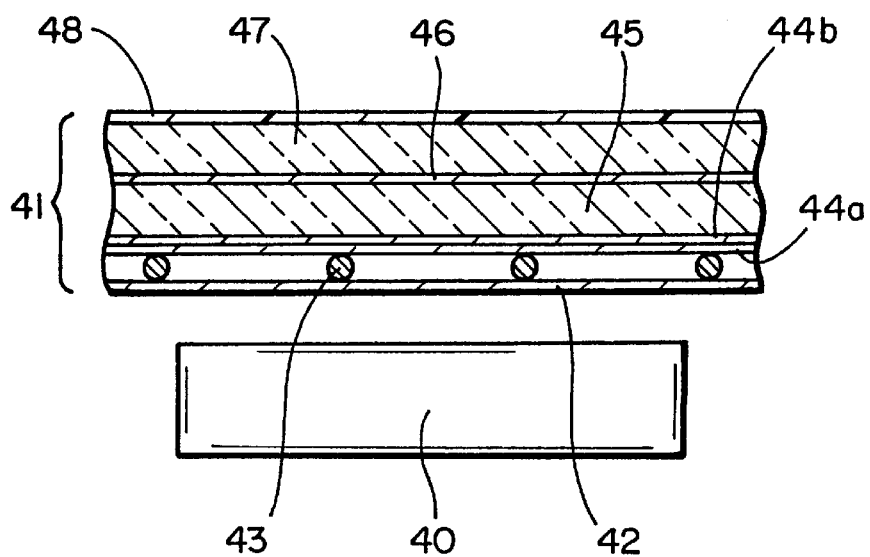
FIG_3B

FOOD TRANSPORT CONTAINER WITH INTEGRAL HEATER

This application claims priority under 35 U.S.C. §§ 119 and/or 365 to U.S. Ser. No. 60/122,146 filed in U.S. on Feb. 26, 1999; the entire content of which is hereby incorporated by reference.

FIELD OF THE INVENTION

This invention relates to containers for transporting and delivering prepared foods and particularly to heated containers for maintaining food at a desired temperature during transport and delivery.

BACKGROUND OF THE INVENTION

Various configurations of containers and bags have been constructed for transport and delivery of prepared foods, including various devices for keeping the food warm during transit. However, prior devices have been inadequate or unacceptable for reasons of poor performance, undue complexity, high cost of manufacture and other reasons. Examples of prior food delivery bags and containers include those illustrated in U.S. Pat. No. 4,806,736 to Schirico, U.S. Pat. No. 4,816,646 to Solomon, et al., and U.S. Pat. No. 4,922,626 to Fiddler. The disclosures of these patents are incorporated herein by reference.

There is a need for an efficient, effective heated food delivery bag or container that also has low cost of manufacture.

SUMMARY OF THE INVENTION

This invention provides a food delivery bag or container of simple construction containing a heater of similar simple construction, which results in a low cost, efficient food delivery bag or container. This inventions achieves such results by combining in a unique combination certain heating elements or devices and certain heat management insulation materials and devices. The combination in its most basic form comprises a food delivery bag or container wherein at least one surface thereof, a side wall, top or bottom, comprises four parts: two metal foil layers, one facing the interior of the bag or container and one facing away from the interior, a heating element positioned between the metal foil layers and an insulation layer on the outside of the metal foil layer facing away from the interior. Each of these four elements can comprise various properties or characteristics, as disclosed herein, and additional layers, elements, components or materials can be incorporated with the basic four elements to enhance desired performance parameters of the food transport container of this invention. This aspect of this invention can be utilized in only one or up to all six surfaces of a cube shaped food bag or transport container, or can be used in a circular wall of a cylinder shaped container.

In one aspect of the invention, the heating element is a conventional resistance wire heater laid between the metal foil layers in any desired pattern. This type heating element has previously not been desirable in this type application due to the hot spot heating characteristics of such heater. However, as this invention provides, the combination of such a heating element with the metal foil layers and the insulation layer, the heat from the heating element is not only spread fairly evenly across the surface area, but the heat is directed toward the food by the insulation layer and by the heat reflecting and radiating characteristics of the metal foil, such as aluminum foil. This combination enables the use of inexpensive resistance heating wire having simple and low power requirements.

The above basic combination of this invention is utilized to construct any desired food or pizza transport and delivery bag or container, depending on the performance needed in a particular situation. The above four element wall construction can be enhanced with additional layers of metal foil, additional layers of insulation material, enclosed in a desired casing, such as fabric or plastic, and, as will be apparent, constructed with conventional closures, carry handles or straps, pockets, logos or advertising and the like.

In another aspect, this invention provides a method of making a food transport or delivery bag or container comprising assembling in at least one wall or surface of the bag or container the combination of two metal foil layers, a heater element positioned between the two metal foil layers and an insulation layer on one side one of metal foil layers opposite the heater element. The method of assembly may comprise including layers of thermoplastic or thermoset adhesive in the form of tape, sheet or spray between the metal foil layers and/or between the metal foil and insulation layers to form a unitary laminate suitable for bag or container construction. The method further comprises forming the wall or surface sections into a desired container shape, attaching the walls or surfaces together in the desired shape and attaching desired closure devices and carrying devices.

BRIEF DESCRIPTION OF THE DRAWINGS

FIG. 1 is a perspective diagram of a bag or container of this invention.

FIG. 2 is a cross section view of a wall portion of the container of FIG. 1.

FIGS. 3A and 3B are sketches illustrating the construction and use of the bag or container of this invention.

DETAILED DESCRIPTION OF THE INVENTION

This invention can best be understood by reference to FIGS. 1 and 2, which illustrate a basic form of a food delivery bag or container. Container 1 comprises side walls 2, front wall 3, back wall 4, top 5, and bottom 6. Electrical plug 10 with power on indicator light 15 is connected to electrical cord 11, which is connected to and powers Ni-chrome heating wire elements 12, 13 and 14. In FIG. 2 the structure of wall 2 is illustrated, which comprises metal foil layer 21, heating element wire 22, metal foil layer 23, fiber insulation layer 24 and optional metal foil layer 25. In a preferred aspect, an adhesive layer is placed between metal foil layers 21 and 23 whereby the heating element wire 22 is laminated between the metal foil layers 21 and 23. Further adhesive layers are placed between metal foil layer 23 and insulation layer 24, and between insulation layer 24 and metal foil layer 25. The fiber insulation may be any desired fiber, including paper, but is preferably a polyester fiber and may comprise a plurality of layers of fiber insulation, which layers may all be the same fiber or may be different types of fibers in different layers. A further optional and preferred fiber insulation layer 26 can be adhered by adhesive to metal foil layer 25, which fiber insulation layer 26 is preferably an aramid type fiber. The inside of wall 2 can be laminated or coated with a plastic film or coating or other materials to protect the foil/heater 21/22 assembly from damage during use. The outside layer (whether it is 24, 25 or 26) of wall 2 can be laminated, coated or assembled with any desired exterior layer of plastic film, plastic coating, fabric layer or other material depending on the use and durability requirements for the bag or container.

The above illustrates the general structure of this invention. It will be apparent to one skilled in the art that numerous variations thereof may be constructed utilizing conventional or specialized components, depending on the performance desired and the costs desired. A desired wall structure of the foil/insulation/foil/insulation combination is available from ATD Corporation, St. Louis, Mo. in the form of THERMSULATE® 3500 or 3600 insulation products, which are also disclosed in U.S. Pat. No. 5,633,064. The heater element/metal foil assembly useful in this invention includes those disclosed in U.S. Pat. No. 5,408,071. Other aspects of such metal foil assemblies and structures which may be useful in the wall structures of this invention include those disclosed in U.S. Pat. Nos. 5,111,577, 5,767,024, 5,939,212, 5,958,603 and in copending U.S. Applications Ser. Nos. 09/001,372 (WO98/44835), and 60/104,909 (PCT Ser. No. US99/24674). The disclosures of these patents and patent applications are incorporated herein by reference in their entirety. For example, in the wall section containing foil/heater/foil (21, 22, 23) assembly, instead of or in addition to the fiber insulation material, the insulation layer (24–26) can be all metal foil or sheet material, such as disclosed in U.S. Pat. No. 5,800,905 above, or can be any desired combination of metal foil or sheet and fiber insulation.

The heater element useful in this invention is preferably a resistance heating wire, such as a 60/40 Ni-chrome wire element available from Pelican Wire in Naples, Fla., because of low cost, ease of assembly and good performance when used with the metal foil layers as constructed according to this invention for spreading the heat from the heating wire across the wider surface. A thermostat may be employed to regulate the heater element. Other heater elements may be used, such as PTC (positive temperature coefficient) wire or sheet heaters, which automatically maintain a constant temperature.

The metal foils employed in this invention are preferably aluminum, because of low cost, good performance and ease of assembly, but other metals may be used, such as copper and stainless steel foils. While foils are preferred in this invention, thicker metal components may be used, such as metal sheets or plates. Foils are preferred for cost, weight and assembly reasons which are obvious. Metal sheets of greater than 6 mils may be used where a more rigid container structure is desired. The foils are generally 1 to 5 mils (1 mil=0.001 in.) in thickness for use in this invention. Preferably the inside foil layers (21) facing the food will be 3 to 5 mils, with about 3 mils preferred for most ordinary applications. The interior foil layers (23, 25) are generally 0.8 to 5 mils in thickness, with about 2 mils preferred for most ordinary applications. The foil layers can be metalized plastic foil or film. It is preferred that the foil layer or layers (21 and/or 23) adjacent the heater element (22) be metal foil or sheet layers to provide sufficient spreading of the heat, whereas metalized film may be used as other foil layer (25) for reflecting heat in the container. The foil layers can be single or multiple layers, smooth, embossed, corrugated, or other configurations as disclosed in the above referenced patents and patent applications, depending on the end use application and the performance desired in the food transport and delivery bag or container constructed according to this invention. However, for most ordinary applications of this invention, smooth individual metal foil layers are preferred from a cost and assembly standpoint.

The fiber insulation utilized in this invention can be any desired material, such as polyester, aramid, cotton, cellulose, nylon, polyolefin or other fibers. The thickness of the layers of fiber insulation can range from 1 to 5 mm for each layer depending on the wall thickness and performance desired. In general, the wall thickness, as illustrated in FIG. 2, will range from 2 to 10 mm or greater, with 4 to 6 mm being preferred. The adhesive layer used to assemble the foil, heater and fiber layers, as well as other additional layers on the inside or the outside of the wall structure can be a sheet adhesive, such as "DAF" or "Surlyn", a double sided adhesive tape or can be a spray on or roll on adhesive, as desired for the particular assembly method employed to assemble the structures of this invention.

Following the teachings of this invention, it will be apparent to one skilled in the art to select the dimensions of the bag or container as adapted to the use desired, mainly warm or hot prepared food, such a pizza delivery, home meal replacement applications, hospital or nursing home meal delivery, or other uses. Likewise, once the size is selected, further selection of the particular combinations of metal foil layers, heater element and insulation according to this invention to produce the desired temperatures, power consumption, heat retention and other characteristics for the application or use in question will be apparent to one skilled in the art. Similarly, the exterior aspects of the bag or container, such as the carry strength, handles, pockets, durability of material, such as nylon or vylon luggage material, etc. are conventional and useful with the combinations comprising this invention.

As an example of this invention and an illustration of a preferred embodiment of this invention, the following is provided. In a configuration shown in FIG. 1, a 12 in. wide by 11 in. deep by 10 in. high bag is constructed with the was material illustrated in FIG. 2 having a total wall thickness for elements 21–26 of between 3 mm and 4 mm (not including exterior fabric case or inclosure or interior plastic or film coating). Plug 10 is adapted for automotive cigarette lighter socket and 12 volt operation. Cord 11 is a 6 ft. cord. Heater elements 12, 13, 14 are Ni-chrome wire, 16 gauge, and have a total length of about 6.5 ft. The heater wire is positioned only in side walls 2 and in bottom 6. The remaining walls 3, 4, 5 are of the same construction as FIG. 2 but without the heater wire element. The heater wires 13, 14 are serpentine configuration about 4 in. wide with a 1.5 to 2 in. spacing. The two heater wires 12 in the bottom are straight. This configuration provides good heating of the food with a maximum wall temperature of about 200° F. and an air temperature inside the bag of about 160 to 170° F. The metal foil layers provide good uniformity of heating and spreading the heat throughout the bag, and the insulation layers provide good heat retention, while being light weight and not bulky to carry. This configuration will run from the 12 volt power supply at a constant heat output of about 100 watts (about 8 amps) without the need for any thermostat control. In such a preferred configuration, about 40% of the heat is provided in each side wall and about 20% is provided in the bottom. It has been found that this distribution of heat is effective for uniform heating of the food and food containers within the bag. Alternatively, the heat distribution may be 80% walls, 10% top, 10% bottom; 60% walls, 10% top, 30% bottom; 20–80% top, 20–80% bottom; 50% walls, 20% top, 30% bottom; or other distribution apparent to one skilled in the art following the disclosures herein. In this preferred configuration a THERMSULATE® 3500 product from ATD Corporation, see U.S. Pat. No. 5,633,064, is utilized by placing the heater wire on a foil surface of the THERMSULATE® 3500 with an adhesive layer, then applying another foil layer on top of the adhesive layer and wire. The resulting structure is that illustrated in FIG. 2 and is used to form the two heated walls and bottom of the bag. The THERMSULATE® 3500 can be used without the heater wire and additional foil layer to form the remaining walls of the bag.

FIG. 3A illustrates another example of a food transport container according to this invention wherein container 30 comprises heating elements 31 and 32 in the bottom and top of the container. The heating elements are connected by wires 33 and 34 to cable 35 and plug 36, which is suitable for connection to an automotive electrical socket to provide electrical power to heating elements 31 and 32. The heating elements are constructed according to those disclosed in U.S. Pat. No. 5,408,071. The wall construction of container 30 is illustrated in FIG. 3B, where the top and bottom contain the heating element in a portion thereof and the side walls have the same layered construction except the heating element is not present between the metal foil layers.

FIG. 3B illustrates a preferred wall/heater construction for container 30 of FIG. 3A. Wall 41 comprises first aluminum foil layer 42 which is 5 mils, coated with a protective plastic layer on the side facing food 40 and adhesively bonded to heating element 43 on the other side. On the other side of wire heating element 43 are the following layers, in order: two aluminum foil layers 44a and 44b, each 2 mils; aramid fiber layer 45, 1 mm; one aluminum foil layer 46, 2 mils; a polyester fiber layer 47, 2 mm; and an exterior nylon fabric layer 48. This construction provides a container that will maintain, when closed, about 150° F. inside for maintaining the food at that temperature, while maintaining an exterior temperature near or only slightly above ambient temperature in the automotive vehicle.

From this disclosure of this invention and the examples given herein, it will be apparent to one skilled in the art how to construct various food transport and delivery bags and containers utilizing the heater/metal foil/insulation combination of this invention to achieve any desired performance for a particular application or use.

What is claimed is:

1. A food transport container comprising:
    walls forming an enclosure wherein at least a portion of at least one wall contains an electric heating element positioned between two metal foil layers;
    a layer of fiber insulation positioned on one of said metal foil layers; and
    a third metal foil layer positioned on the fiber insulation layer.

2. A container according to claim 1 whereby the enclosure is adapted for positioning the food therein adjacent the metal foil layer on the opposite side of the heating element from the fiber insulation layer.

3. A container according to claim 1 comprising an adhesive layer between the heater element and the foil layers.

4. A container according to claim 1 comprising a protective plastic layer between the metal foil layer and the food.

5. A container according to claim 1 comprising an electrical connector adapted for connection to an automotive 12 volt outlet.

6. A container according to claim 1 comprising in at least one wall having, in order from the food side, a metal foil layer, electric heater element, two metal foil layers, a fiber layer, a metal foil layer and a fiber layer.

7. A method of constructing a heated food transport container comprising:
    assembling an electric heater element between two metal foil layers, a fiber insulation layer on one of the metal foil layers and a third metal foil layer on the other side of the fiber insulation layer; and
    constructing an enclosed container wherein the above assembly comprises at least one wall of the container and wherein the metal foil and heater element side faces the interior food area and the fiber insulation metal foil side faces the exterior of the container.

8. A method according to claim 7 comprising applying a protective plastic layer on the metal foil facing the food area.

9. A method according to claim 7 comprising providing a fabric covering layer for the exterior of the container.

10. A method according to claim 7 comprising providing a connector for the heater adapted for connection to an automotive 12 volt outlet.

11. A method according to claim 7 comprising providing two metal foil layers between the heater element and the fiber insulation layer.

12. A method according to claim 7 comprising providing a second fiber insulation layer and an additional metal foil layer on said third metal foil layer.

* * * * *